United States Patent Office 2,871,164
Patented Jan. 27, 1959

2,871,164

PRODUCTION OF PENICILLIN IN PRESENCE OF A POLYTHIONATE

Merlin H. Peterson, Libertyville, Ill., assignor to Abbott Laboratories, North Chicago, Ill., a corporation of Illinois No Drawing. Application October 22, 1956
Serial No. 617,211

4 Claims. (Cl. 195—36)

This invention relates to a method for increasing the production of penicillin by supplementing medial sulfur in the penicillin fermentation.

Penicillin is the widely known antibiotic substance produced by the fermentation of molds of the genus Penicillium among which representative species are *Penicillium notatum* and *Penicillium chrysogenum*. The most widely used method for the production of penicillin is by a deep culture, aerobic fermentation method employing a suitable nutrient medium comprising water, nutrient salts, a carbohydrate, oils providing a carbon source, corn steep solids and a penicillin precursor. The corn steep solids provide nitrogenous substance which results in a greater yield of antibiotic substance from the fermentation mold. Because of the widespread use of corn steep solids, the nutrient media wherein such are added are commonly referred to as corn steep liquor media. The corn steep liquor medium provides natural organic precursors which become part of the penicillin molecule having the following general formula:

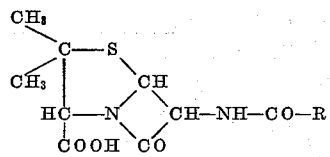

The characteristic R varies with the ingredients used in the nutrient medium which provides natural organic precursors. R can represent, for example, a 4 or 5 carbon alkyl chain or a phenyl hydroxide group. It has been found that the addition of known penicillin precursors to the nutrient medium not only imparts a certain organic group to the penicillin molecule but at the same time increases production of penicillin. Thus, phenylacetamide and β-phenylethylamine, for example, result in an increased production of benzyl penicillin or penicillin G. In the same manner precursors have been added to the nutrient medium in preparing penicillin S (phenylmercaptoacetic acid) and penicillin V (phenoxyacetic acid).

It is the object of this invention to achieve a higher yield of penicillin than has heretofore been attained from penicillin-fermenting mold in a nutrient medium.

Another object is to achieve a higher yield of penicillin by simple supplementation of accepted and practiced nutrient media.

In the deep culture method under aerobic conditions and in the presence of a penicillin precursor, addition of utilizable sulfur to the media results in increased production of the antibiotic, penicillin. One of such sulfur forms is the thiosulfate salt as disclosed in U. S. Patent No. 2,761,812. It has now been found that the polythionic acid salts, preferably the tetrathionate salts, result in even greater penicillin yield from penicillin-fermenting molds than is achieved by supplementation with the thiosulfate salt.

In the practice of the present invention an optimal concentration of a water soluble polythionic acid salt is added to a nutrient. The optimal concentration of said compound is determined for any particular fermentation process by plotting the penicillin production vs. tetrathionate concentration in the medium. The optimal concentration of the polythionate will, of course, vary slightly according to the particular composition of the nutrient medium and the type of fermentation production used, for example, whether laboratory scale shaker-flask production or larger scale production involving big fermentors is used. With the presently used deep culture fermentation processes and with the available strains of microorganisms, the optimum concentration of a tetrathionate salt is about 0.1% by weight of the nutrient medium and at least 0.025% is necessary to produce a response. With the present microorganisms; the tetrathionate is toxic to the organism at a concentration above about 0.6% by weight of the nutrient medium.

Following the addition of the polythionic salt to the medium it is sterilized and then inoculated with a penicillin culture. The fermentation is carried out under aerobic conditions with agitation. In the case of a shaker-flask fermentation, aeration is provided from the atmosphere as the flasks are rotated on a driven disc and in the larger fermentors, air must be fed into the medium.

The following examples further illustrate the practice of this invention but it should be understood that said examples are not intended to limit the invention to the specific proportions or ingredients shown.

EXAMPLE I

A basal fermentation nutrient medium of the following composition is prepared in the conventional manner.

| Ingredient: | Grams/liter |
|---|---|
| Corn steep solids | 25 |
| Lactose | 40 |
| CLRS | 16 |
| $CaCO_3$ | 4 |
| $NaNO_3$ | 3 |
| $KH_2PO_4$ | 0.5 |
| $MgSO_4 \cdot 7H_2O$ | 0.25 |
| β-Phenylethylamine | 2 |

The nutrient medium (50 cc.) is placed in each of nine shaper flasks, 3 flasks of which are supplemented with sodium thiosulfate (1.00 g./l.), 3 flasks are supplemented with sodium tetrathionate (0.58 g./l.), and the remaining 3 flasks contain only the basal unsupplemented medium. The pH of the medium is adjusted to 5.4 with sodium carbonate prior to sterilization, thereafter, the flasks are plugged and sterilized in an autoclave at 250° F. for 35 minutes. After sterilization is achieved, each flask is inoculated with a 4% by volume of a 72-hour vegetative shaken flask culture of *Penicillium chrysogenum*. The fermentations are carried out by holding the inoculated flasks for 6 days at 25° C. on a rotary shaker operating at 240 R. P. M. The penicillin yields obtained on the various media are given in the following table wherein the units of activity are the Oxford or International units.

Table I

| Form of Sulfur Supplement | Maximum Average Penicillin yield for 3 Flasks, u./ml. |
|---|---|
| none | 2,053 |
| sodium thiosulfate | 3,103 |
| sodium tetrathionate | 3,503 |

EXAMPLE II

A basal fermentation nutrient medium of the following composition is prepared.

| Ingredient: | Grams/liter |
|---|---|
| Corn steep solids | 30 |
| Lactose | 60 |
| CLRS | 8 |
| $CaCO_3$ | 4 |
| $NaNO_3$ | 1.5 |
| $KH_2PO_4$ | 0.5 |
| $MgSO_4 \cdot 7H_2O$ | 0.25 |
| Phenylacetic acid | 3 |

The above nutrient medium (12 liters) is placed in each of two 30-liter fermentors. One fermentor is supplemented with an optimum level of sodium tetrathionate (0.87 g./l.) and the remaining fermentor contains only the nutrient medium with no added sulfur. The pH of the medium is adjusted to 5.4 with sodium carbonate prior to sterilization. The fermentors are sterilized in an autoclave at 250° F. for 60 minutes, thereafter, each fermentor is inoculated with an 8% by volume of a 48 hour vegatative 30-liter fermentor culture of *Penicillium chrysogenum*. The fermentations are carried out for 6 days at 25° C. while aerating the medium at a rate of 0.8 volume per volume per minute and agitating the nutrient medium with an impeller at a rate of 240 R. P. M. The yields of penicillin G obtained from the various media are given in the following table.

*Table II*

| Form of Sulfur Supplement | Maximum Penicillin Yields, u./ml. |
|---|---|
| none | 2,037 |
| sodium tetrathionate | 3,280 |

The foregoing examples illustrate the superiority of the tetrathionate salt over the basal unsupplemented medium and the basal medium supplemented with the thiosulfate salt.

The polythionic acid salts suitable for use in the present invention are the salts of dithionic, trithionic, tetrathionic and pentathionic acids. The polythionate salts of the foregoing acids can be any partially soluble salt thereof as for example, potassium, ammonium, magnesium, sodium and the like. The penicillin precursors can be chosen from organic substances, such as phenylacetic acid, phenylacetamide, β-phenyl-ethylamine and like penicillin precursors known to those skilled in the art.

Others may readily adapt the invention for use under various conditions of service, by employing one or more of the novel features disclosed or equivalents thereof. As at present advised with respect to the apparent scope of my invention, I desire to claim the following subject matter:

1. A fermentation process for the production of penicillin which comprises growing aerobically under deep culture fermentation conditions, a penicillin-forming mold in a nutrient medium containing a small amount of a water-soluble salt of a polythionic acid, and containing the fermentation process under deep culture, aerobic conditions until a substantial amount of penicillin is produced in the said nutrient medium.

2. A process as defined in claim 1 in which the said salt of polythionic acid is a water soluble tetrathionate salt.

3. A process as defined in claim 2 in which the said tetrathionate salt is sodium tetrathionate.

4. A process as defined in claim 2 in which the tetrathionate salt is sodium tetrathionate present in the nutrient medium at a concentration of at least about 0.1% by weight of the said medium.

References Cited in the file of this patent

UNITED STATES PATENTS

| 2,761,812 | Hockenhull | Sept. 4, 1956 |
| 2,768,117 | Kaplan | Oct. 23, 1956 |